United States Patent [19]

Sacripante et al.

[11] Patent Number: 5,213,934
[45] Date of Patent: May 25, 1993

[54] MICROCAPSULE TONER COMPOSITIONS

[75] Inventors: Guerino Sacripante; Beng S. Ong, both of Ontario, Canada; Bing R. Hsieh, Webster; Robert McNamara, Rochester, both of N.Y.

[73] Assignee: Xerox Corporation, Stamford, Conn.

[21] Appl. No.: 637,697

[22] Filed: Jan. 7, 1991

[51] Int. Cl.$^5$ .................. G03G 9/00; G03G 5/00; G03C 1/72
[52] U.S. Cl. ..................... 430/109; 430/137; 430/138
[58] Field of Search .................. 430/109, 137, 138

[56]  References Cited

U.S. PATENT DOCUMENTS

| 3,528,097 | 8/1970 | Otsuka et al. |
| 3,876,610 | 4/1975 | Timmerman et al. |
| 3,974,078 | 8/1976 | Crystal et al. |
| 4,000,087 | 12/1976 | Maalouf. |
| 4,307,169 | 12/1981 | Matkan. |
| 4,309,213 | 1/1982 | Graber et al. ............ 424/410 X |
| 4,482,606 | 11/1984 | Bousquet et al. .......... 428/402.2 |
| 4,565,764 | 1/1986 | Nakahara et al. ............ 430/111 |
| 4,636,451 | 1/1987 | Matkin. |
| 4,644,030 | 2/1987 | Loerigkeit et al. ........... 524/457 |
| 4,671,954 | 6/1987 | Goldberg et al. ............ 424/450 |
| 4,727,011 | 2/1988 | Mahabadi et al. |
| 4,777,104 | 10/1988 | Matsumoto et al. ............ 430/109 |
| 4,855,209 | 8/1989 | Martin et al. |
| 4,876,313 | 10/1989 | Lorah ..................... 525/281 |
| 4,877,706 | 10/1989 | Mahabadi et al. |
| 4,920,004 | 4/1990 | Bagchi .................. 430/138 X |
| 4,937,167 | 6/1990 | Moffatt et al. |
| 4,975,224 | 12/1990 | Pringle .................... 252/628 |
| 5,013,630 | 5/1991 | Ong et al. ................. 430/109 |

FOREIGN PATENT DOCUMENTS 2128350 4/1984 United Kingdom ............ 430/109

Primary Examiner—Marion E. McCamish
Assistant Examiner—S. Crossan
Attorney, Agent, or Firm—Oliff & Berridge; Eugene O. Palazzo

[57]  ABSTRACT

Microcapsule toners comprise a polymeric shell and a core containing colorants and a polymer binder. Part of the polymer binder is chemically grafted to the shell polymer. A process of preparing the microcapsule toners involves a shell forming interfacial polycondensation and a core binder forming free radical polymerization. The grafting of core binder to the shell is accomplished via the involvement of a polyfunctional reagent capable of reacting with both the shell and core monomers, or involvement of a shell monomer bearing a core monomer functionality.

39 Claims, No Drawings

MICROCAPSULE TONER COMPOSITIONS

BACKGROUND OF THE INVENTION

The present invention is generally directed to microcapsule toner compositions, and specifically, to improved microcapsule toner compositions formed by polymerization reactions.

A microcapsule toner is comprised of toner particles in which a core component containing the polymer binder and colorant materials of the toner is surrounded by a shell component. The shell performs a protective function whereby the core material is kept intact until it is required during a reprographic fusing process. The microcapsule toner compositions of the present invention are useful with a variety of known imaging processes including electrophotographic and ionographic imaging processes. In one embodiment, the microcapsule toner compositions can be selected for pressure fixing processes wherein the image is fixed with pressure. Pressure fixing is common in ionographic processes in which latent images are generated on a dielectric receiver such as silicon carbide. The latent images can then be toned with a conductive microcapsule toner by inductive single component development, and transferred and fixed simultaneously (i.e., transfixed) in a single step onto paper with pressure. In another embodiment, the toner compositions of the present invention can be utilized in imaging apparatuses wherein image toning and transfer are accomplished electrostatically, and transferred images are fixed in a separate step by means of a heat fuser or a pressure roll with or without the assistance of thermal or photochemical energy.

In U.S. Pat. No. 3,974,078 to Crystal et al., a toner is disclosed in which at least a major portion of the resin component is a soft polymer encapsulated and dispersed into a tough, polymer matrix in a plurality of discrete domains, instead of a single core.

In U.S. Pat. No. 3,876,610 to Timmerman et al., an electrostatic toner material is disclosed which is composed of particles having a nucleus made of a polymer of an unsaturated monomer surrounded by an outer envelope made mainly of a graft-copolymer of this polymer with an unsaturated monomer grafted with a non-ionic polymer.

In U.S. Pat. No. 4,636,451 to Matkin, pressure-fixable toner-material is disclosed wherein the toner particles comprise a thin, substantially continuous surface layer of polyurea, and an interior portion comprising a matrix of polyurea, the matrix having a colorant and pressure fixable material contained therein. The toner particles contain discontinuities formed by the polyurea matrix which facilitates particle disintegration upon application of pressure to allow low pressure fixability.

Microcapsule toner can be prepared by various physical and mechanical processes. The chemical processes often involve polymerization reactions, including interfacial polycondensation reactions and free radical polymerization. Interfacial polymerization is preferred for forming a microcapsule shell.

Present methods of forming toner using such polymerization reactions produce shells which may be too porous, thus permitting the core material to escape prematurely. A porous shell can be the source of many problems related to inferior operation of the reprographic system, such as core binder diffusion, toner agglomeration, blocking (agglomeration at high temperatures, such as 55° C. over 48 hours), image offset, and decreased shelf life of the toner. If the core binder diffuses out of the shell, it will cause the toner to agglomerate. This results in the problems of poor toner flow and image offset in images processed in the reprographic system.

A porous shell is also prone to breaking, and lacks the necessary mechanical properties to ensure shell integrity. It is desirable to provide a toner with decreased porosity and increased shell integrity.

SUMMARY OF THE INVENTION

It is an object of the invention to provide a microcapsule toner which is resistant to agglomeration and blocking.

It is another object of the invention to provide a microcapsule toner with improved shelf-life.

It is yet another object of the invention to provide a microcapsule toner which will not contribute to an image offset problem.

These and other objects of the invention are achieved by providing an improved microcapsule toner comprising a core and a shell wherein part of the core binder material has been bonded to the shell structure. A process for preparing the toner compositions is also provided; wherein, in addition to the shell forming interfacial polycondensation and the core binder forming free-radical polymerization, a polyfunctional reagent capable of reacting with both the shell and core monomers is utilized. The polyfunctional reagent effectively serves to graft some of the core binder generated from the free radical polymerization onto the inner shell wall. Alternatively, the grafting can be achieved by the use of a shell monomer having functionalities which can react with the core monomer.

Thus the present invention is directed to a microcapsule toner and a process for the preparation of the microcapsule toner wherein microcapsule toner particles are formed with the necessary shell integrity, improved resistance to core binder leaching, improved toner shelf stability, and improved toner flow characteristics. The toners of the present invention are highly resistant to agglomeration, blocking and image offset problems.

DETAILED DESCRIPTION OF PREFERRED EMBODIMENTS

This invention provides for an improved microcapsule toner wherein part of the core binder material is chemically bonded to the shell structure. This creates a "sealant" layer on the inner wall of the shell which substantially decreases the permeability of the shell to the binder materials. This in turn substantially reduces agglomeration and blocking which may otherwise result from the diffusion of the core binder materials to the exterior surface of the microcapsule shell.

In a general embodiment, the linkage between the core binder and the shell wall is formed by the reaction of a polyfunctional reagent with the shell and core monomers during their polymerizations. Specifically, the polyfunctional reagent bears in its molecular structure both the shell and core monomer functionalities which enable its reaction with both the shell and core monomers. The reaction of the polyfunctional reagent with the shell monomer leads to its incorporation into the shell polymer, while its reaction with the core monomer during the free radical polymerization step serve to graft some of the ensuing core binder molecules onto the shell structure. Similarly, in the alternative embodiment mentioned above, the reaction of functionalities on the shell monomer with the core monomer may serve to graft some of the core binder molecules onto the shell structure. One advantage of this approach is the improved stability of the core binder material within the microcapsule. The other advantage is the enhanced robustness of the shell structure.

Generally, the toner is composed of a core which is formed of a resinous material, comprising a binder and a colorant such as a pigment or dye, and the shell is comprised of a tough material to protect the core material, such as a polyurea or polyamide. The toner of the present invention also contains a layer of core binder bonded to the inner shell of the toner. The toner is therefore very stable, and its shell structure remains intact until it is ruptured by an external means such as a pressure roll or heat fuser during the reprographic fusing process, which releases the toner's core material.

To accomplish the bonding of some of the core binder onto the shell polymer, it has been found to be advantageous to utilize polyfunctional reagents which contain suitable shell and core monomer functionalities. More specifically, the polyfunctional reagent may contain shell monomer functionalities such as NCO, COCl and the like, for reaction with the water soluble shell monomer component such as polyamine or polyol, or it may contain $NH_2$, OH or the like, for reaction with the oil soluble polyisocyanate or polyacyl halide component; and at the same time, it should also carry certain core monomer functionalities such as an acrylic or methacrylic group to enable its participation in the free radical polymerization. Alternatively, at least one of the shell monomers themselves may have functionalities which can react with the core monomer, thereby effecting a grafting of some of the core binder molecules onto the shell structure.

According to a preferred embodiment, toner compositions of the invention can be formulated by an interfacial/free-radical polymerization process in which the shell formation and the core formation are controlled independently. This invention can be used to form a large variety of microcapsule toners, such as pressure-fusible and/or heat-fusible microcapsule toners, either color or black. Such a process may comprise the following steps.

(1) An organic phase is formed by mixing or blending a core monomer or monomers, a free radical initiator or initiators, a colorant, a polyfunctional reagent bearing both the shell and core monomer functionalities; an oil soluble shell monomer or monomers, and an optional organic diluent. Alternatively, in place of the polyfunctional reagent, at least one of the shell monomers may have functionalities which can react with the core monomers.

(2) The resulting mixture of organic materials is dispersed, for example by high shear blending, into stabilized microdroplets in an aqueous medium with the assistance of suitable dispersants or suspension agents.

(3) Water-soluble shell monomer(s) are then added to the dispersion and the aforementioned stabilized microdroplets are subjected to a shell forming interfacial polycondensation. This produces a shell around the core materials The polyfunctional reagent in the microdroplet phase either reacts with the shell monomer component present in the microdroplet phase or with the water soluble shell monomer component in the aqueous phase, depending on the nature of the shell monomer functionality it carries. This leads to the incorporation of the polyfunctional reagent into the shell polymer, giving rise to the presence of core monomer functionalities on the shell structure. Alternatively, the core binder functionalities may be pre-formed on the water-soluble shell monomer and/or the oil-soluble shell monomer.

(4) The core monomer is then polymerized by free radical polymerization, which may be heat induced, within the newly formed microcapsules. During the polymerization, some of the core monomers will also polymerize together with the core monomer functionalities on the shell polymer, thus effecting the grafting of some of the resulting core binder onto the shell wall. The microcapsule particles thus formed may then be washed and dried, preferably by spray-drying, fluidized bed drying or freeze drying process.

The shell forming interfacial polycondensation is generally accomplished at ambient temperature, but elevated temperatures may also be employed depending on the nature and functionality of the shell monomers selected. The free radical polymerization of the core is generally effected at a temperature from ambient temperature to about 100° C., and preferably from about 25° C. to about 85° C. In addition, more than one initiator may be utilized to enhance the polymerization conversion, and to generate the desired molecular weight and molecular weight distribution.

Typical core monomers include styrene, α-methylstyrene, vinyl toluene, n-alkyl methacrylates, n-alkyl acrylates, branched alkyl methacrylates, branched alkylacrylates, chlorinated olefins, butadiene, vinylphenolic materials, alkoxy alkoxy alkyl acrylates, alkoxy alkoxy alkyl methacrylates, cyano alkyl acrylates and methacrylates, alkoxy alkyl acrylates and methacrylates, methyl vinyl ether, maleic anhydride, and the like. More specifically the core monomers include, but are not limited to, addition-type monomers such as methyl acrylate, methyl methacrylate, ethyl acrylate, ethyl methacrylate, propyl acrylate, propyl methacrylate, butyl acrylate, butyl methacrylate, iso-butyl methacrylate, pentyl acrylate, pentyl methacrylate, hexyl acrylate, hexyl methacrylate, heptyl acrylate, heptyl methacrylate, octyl acrylate, octyl methacrylate, cyclohexyl acrylate, cyclohexyl methacrylate, lauryl acrylate, lauryl methacrylate, stearyl acrylate, stearyl methacrylate, benzyl acrylate, benzyl methacrylate, ethoxypropyl acrylate, ethoxypropyl methacrylate, methylbutyl acrylate, methylbutyl methacrylate, ethylhexyl acrylate, ethylhexyl methacrylate, methoxybutyl acrylate, methoxybutyl methacrylate, cyanobutyl acrylate, cyanobutyl methacrylate, tolyl acrylate, tolyl methacrylate, styrene, substituted styrenes, and other substantially equivalent addition monomers such as methyl vinyl ether, maleic anhydride, and the like. These monomers may be present alone or as mixtures of monomers to form copolymers. The monomers may also be present in conjunction with preformed polymers so that subsequent polymerization of the core monomer results in a polymer blend, which may be both a compatible blend, wherein the polymers are miscible and form a uniform, homogeneous mixture, or an incompatible blend, wherein one polymer is present in discrete regions or domains within the other polymer. Examples of suitable polymers include polymers of the monomers listed above as suitable core monomers, as well as copolymers of these monomers, such as styrene-butadiene copolymers, styrene-acrylate and styrene-methacrylate copolymers, ethylene-vinylacetate copolymers, isobutylene-isoprene copolymers, and the like.

In particular, it has been found that a "flush" of an organic pigment in a preformed polymer, for example Hostaperm Pink E in a copolymer resin consisting of about 65 percent by weight of styrene and about 35 percent by weight of n-butyl methacrylate, can be mixed with styrene and/or acrylate monomers to form the core material, and these monomers can be subsequently polymerized after shell formation to produce a fully polymerized core in which the dispersion of pigment is extremely uniform.

Waxes or wax blends may also be added to the core in amounts of from about 0.5 percent by weight to about 20 percent by weight of the core to improve the low melting properties and/or release properties of the toner. Specific examples of waxes include candelilla, bees wax, sugar cane wax, carnauba wax, paraffin wax and other similar waxes, particularly with a melting point of about 60° C.

Any suitable colorants may be used in the present invention, and include Violet Toner VT-8015 (Paul Uhlich), Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Lithol Scarlet D3700 (BASF), Tolidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Co.), Royal Brilliant Red RD-8192 (Paul Uhlich), Oracet Pink RF (Ciba-Geigy), Paliogen Red 3872K (BASF), Paliogen Red 3340 (BASF), Lithol Fast Scarlet L4300 (BASF), Heliogen Blue L6900, L7020 (BASF), Heliogen Blue K6902, K6910 (BASF), Heliogen Blue D6840, D7080 (BASF), Sudan Blue OS (BASF), Neopen Blue FF4012 (BASF), PV Fast Blue B2G01 (American Hoechst), Irgalite Blue BCA (Ciba-Geigy), Paliogen Blue 6470 (BASF), Sudan III (red orange) (Matheson, Coleman, Bell), Sudan II (orange) (Matheson, Coleman, Bell), Sudan IV (orange) (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FGL (Hoechst), Permanent Yellow YE 0305 (Paul Uhlich), Lumogen Yellow D0790 (BASF), Suco-Gelb L1250 (BASF), Suco-Yellow D1355 (BASF), Sico Fast Yellow D1355, D1351 (BASF), Hostaperm Pink E (American Hoechst, Fanal Pink D4830 (BASF), Cinquasia Magenta (DuPont), Paliogen Black L0084 (BASF), Pigment Black K801 (FASF), and carbon blacks such Regal 330® (Cabot), Carbon Black 5250 and Carbon Black 5750 (Columbia Chemicals Company), Bayferrox 8610 iron oxide (Mobay), Mapico Black iron oxide (Columbia), TMB-100 iron oxide (Magnox), BK8699 iron oxide (Pfizer), NP608 iron oxide (Northern Pigment), Iron powder (Sicopur 4068, BASF), Cobalt powder (Noah Chem. Co.), nickel powder, mixtures thereof and the like.

Any suitable free radical initiator may be employed if the core material is to be prepared by a free radical polymerization subsequent to the interfacial polymerization reaction that forms the toner shell. Preferably, the 10 hour half-life temperature of the initiator is less than about 120° C., more preferably less than about 90° C. Suitable free radical initiators include azo type initiators, such as 2,2'-azobis(isobutyronitrile), 2,2'-azobis(2,4-dimethylvaleronitrile), 2,2'-azobis(cyclohexanenitrile), 2,2'-azobis-(2-methylbutyronitrile), 2,2'-azobis(2,2'-azobis(2,4-dimethyl-4-methoxyvaleronitrile)) or any combination thereof. Suitable free radical initiators also include peroxide type initiators such as benzoyl peroxide, lauroyl peroxide and 2,5-dimethyl-2,5-bis(2-ethylhexanoyl-peroxy)hexane, Lupersol 256® (Pennwalt), or any combination thereof. Typically, a low temperature reacting initiator is present in the core material, being activated at temperatures of from about 50° C. to about 65° C. The low temperature initiator is preferably present in an amount of from about 0.5 to about 6 percent by weight of the core monomers, and more preferably from about 2 to about 4 percent by weight of the core monomers. Optionally, a high temperature initiator may also be present in the core material, being activated at temperatures of over 65° C. The high temperature initiator may be present in amounts of from 0 to about 2 percent by weight of the core monomers, and preferably from about 0.5 to about 1.25 percent by weight of the core monomers.

Suitable oil soluble shell monomers which can be employed for the shell-forming interfacial polymerization include benzene diisocyanate, toluene diisocyanate, diphenylmethane diisocyanate, trans-1,4-cyclohexane diisocyanate, hexamethylene diisocyanate (Fluka), dodecane diisocyanate (Dupont), 2-methylpentyldiisocyanate (Dupont), dicyclohexylmethane diisocyanate (Desmodur W, available from Mobay), Isonate 143L (liquid MDI based on 4,4-methyldiphenyl diisocyanate, available from the Upjohn Co.), tris(isocyanatophenyl) thiophosphate (Desmodur RF, available from Mobay), 3,3,5-trimethylhexamethylenediisocyanate (Huls), MONDUR CB-60 (Mobay), MONDUR CB-75, MONDUR MR, MONDUR MRS 10, PAPI 27, PAPI 135, PAPI 94, PAPI 901 (Mobay), Isonate 181, Isonate 125M, Isonate 191, and Isonate 240, adipoyl chloride, fumaryl chloride, suberoyl chloride, succinyl chloride, phthaloyl chloride, isophthaloyl chloride, terephthaloyl chloride, ethylene glycol bischloroformate, diethylene glycol bischloroformate, and the like. Other oil soluble shell monomers include polyether diisocyanate prepolymers such as Desmodur M (Mobay), Desmodur E-21 (Mobay), Vibrathane B-602 (Uniroyal), Vibrathane B-603 (Uniroyal), Vibrathane B-604 (Uniroyal), polyester prepolymer diisocyanates such as Adiprene L-83 (Uniroyal), Adiprene L-167 (Uniroyal), Adiprene L-252 (Uniroyal), (Uniroyal), Vibrathane 8021 (Uniroyal), Vibrathane 6007 (Uniroyal), mixtures thereof and the like.

Examples of water-soluble shell monomers which can be employed for the shell-forming interfacial polymerization include 1,6-hexanediamine 1,4-bis(3-aminopropyl)piperazine, 2-methylpiperazine, m-xylene-$\alpha,\alpha'$-diamine, 1,8-diamino-$p$-menthane, 3,3'-diamino-N-methyldipropylamine and 1,3-cyclohexanebis(methylamine) (Aldrich); 1,4-diaminocyclohexane and 2-methylpentanediamine (Dytek A) (DuPont); 1,2-diaminocyclohexane, 1,3-diaminopropane, 1,4-diaminobutane, 2,5-dimethylpiperazine and piperazine (Fluka); fluorine-containing 1,2 diaminobenzene (PCR Incorporated); and N,N'-dimethylethylenediamine (Alfa); bis-phenols. Other aqueous soluble shell monomers having a functionality greater than two include diethylenetriamine and bis(3-aminopropyl)amine (Fluka) and tris(2-aminoethyl)amine (TREN-HP) (W. R. Grace Company), Jeffamine materials such as Jeffamine ED-600, ED-900, C-346, DU-700 and EDR-148 from Texaco Chemical Co., and the like. For direct bonding, diamines are preferred.

In general, more than one oil soluble shell monomer can be used to react with more than one aqueous phase shell monomer. Although formation of the shell may entail reaction between at least two shell monomers, one soluble in organic phase and one soluble in aqueous phase, as many as five or more monomers soluble in organic phase and/or as many as five or more monomers soluble in aqueous phase can be reacted to form the shell in some embodiments. In some preferred embodiments, two monomers soluble in organic phase and two monomers soluble in aqueous phase can be reacted to form the shell.

Typical shell polymers include polyureas, polyurethanes, polyesters, thermotropic liquid crystalline polyesters, polycarbonates, polyamides, polysulfones, and the like, or mixtures of these polymers such as poly(urea-urethanes), poly(ester-amides), and the like, which can be formed in a polycondensation reaction of suitably terminated prepolymers or macromers with different condensation monomers. For example, a preformed alcohol terminated urethane prepolymer can be copolymerized with a diacyl halide to form a poly(ester-urethane) in an interfacial reaction, or an amine terminated amide prepolymer can be copolymerized with a diisocyanate to produce a poly(urea-amide) copolymer. Various polyfunctional shell monomers, such as triamines, triisocyanates, and triols can be employed in small quantities of from about 0.01 percent to about 30 percent as crosslinking agents to introduce rigidity and strength into the shells. For direct bonding, vinyl terminated polymers and polyurethanes are preferred.

Examples of suitable polyfunctional reagents which may be utilized to effect grafting of core binder onto the shell structure include the following bifunctional reagents: isocyanato-ethyl methacrylate, 2-isocyanatoethyl acrylate, 3-isocyanato-propyl methacrylate, 3-isocyanato-propyl acrylate, isocyanato-butyl methacrylate, isocyanato-butyl acrylate, isocyanato-pentyl methacrylate, isocyanato-pentyl acrylate, isocyanato-hexyl methacrylate, isocyanato-hexyl methacrylate, isocyanato-heptyl methacrylate, isocyanato-heptyl acrylate, isocyanato-octyl methacrylate, isocyanato-octyl acrylate, isocyanato-lauryl methacrylate, isocyanato-dodecane methacrylate, m-isocyanato-styrene, p-isocyanato-styrene, o-isocyanatostyrene, m-isocyanato-alpha-methyl styrene, o-isocyanatoalpha-methyl styrene, p-isocyanato-alpha-methyl styrene, (3-isocyanato-phenyl)-methacrylate, (2-isocyanato-phenyl)-methacrylate, (4-isocyanato-phenyl)- methacrylate, (3-isocyanato-phenyl)-acrylate, 2-amino-ethyl acrylate, 3-amino-propyl methacrylate, 3-amino-propyl acrylate, amino-butyl methacrylate, amino-butyl acrylate, amino-pentyl methacrylate, amino-pentyl acrylate, amino-hexyl methacrylate, amino-hexyl acrylate, amino-heptyl methacrylate, amino-heptyl acrylate, amino-octyl methacrylate, amino-octyl acrylate, amino-lauryl methacrylate, amino-dodecane methacrylate, 2-(2-amino-ethyl) acrylate, 3-amino-propyl methacrylate, 3-amino-propyl acrylate, amino-butyl methacrylate, amino-butyl acrylate, amino-pentyl methacrylate, amino-pentyl acrylate, amino-hexyl methacrylate, amino-hexyl methacrylate, amino-heptyl methacrylate, amino-heptyl acrylate, amino-octyl methacrylate, amino-octyl acrylate, amino-lauryl methacrylate, amino-dodecane methacrylate, 1-(1-isocyanato-1-methylethyl)-3-(1-methylethenyl)-benzene available from Cyanamid as TMI (meta), 1-(1-isocyanato-1-methylethyl)-4-(1-methylethenyl)-benzene available from Cyanamid as TMI (para), methacryloxy terminated ethyleneglycol including monomethacryloxy terminated ethyleneoxide prepolymers of low molecular weights from about 200 grams per mole to about 2,000 grams per mole, polydimethylsiloxane of molecular weight ranging of from about 300 grams per mole to about 60,000 grams per mole and terminated with a 3-aminopropyl moiety at one end and a 3-(methacrylamido)-propyl moiety at the other end (structure III), mixtures thereof and the like, including others known to the art.

Trifunctional and multifunctional reagents capable of effecting the grafting of core binder include Bis-N,N'(2-hydroxyethyl) methacrylamide, Bis-N,N'(2-hydroxyethyl) acrylamide, Bis-N,N'(3-hydroxypropyl) methacrylamide, Bis-N,N'(3-hydroxypropyl) acrylamide, 2,4-diisocyanato-styrene, 2,4-diisocyanato-styrene, 2,3-diisocyanato-styrene, 2,5-diisocyanato-styrene, 3,5-diisocyanato-styrene, 2,3-diisocyanato-alpha-methylstyrene, 2,4-diisocyanato-alpha-methylstyrene, 2,5-diisocyanato-alpha-methylstyrene, 3,5-diisocyanato-alpha-methylstyrene, 3,5-diisocyanato-alpha-methylstyrene, Bis(N-ethyl-2-methacrylamido) amine, Bis(N-ethyl-2-acrylamido) amine, 2,4-diaminostyrene, 2,5-diaminostyrene, 3,5-diaminostyrene, 2,3-diaminostyrene, 2,4-diamino-alphamethyl-styrene, 2,5-diamino-alpha-methyl-styrene, 3,5-diamino-alpha-methyl-styrene, 2,3-diamino-alpha-methyl-styrene, N-acryloyltris-(hydroxymethyl)-amino methane (NAT, available from Aldrich), 1,3-dimethacryloyl-4,6-diisocyanatobenzene, 1,3-dimethacryloyl-4,6-diamino-benzene, mixtures thereof and the like, including others known to the art.

Heat fusible microcapsule toner compositions generally comprise from about 1 to about 15 percent by weight, preferably from about 3 to about 10 percent by weight, of a colorant or colorants; from about 2 to about 30 percent by weight, preferably from about 5 to about 20 percent by weight, of the polymeric shell; from about 30 to about 97 percent by weight, preferably from about 60 to about 90 percent by weight, of the core polymer; and from about 0.01 to about 20 percent by weight, preferably from about 0.1 to about 15 percent by weight, of the polyfunctional reagent. In cases where preformed core binder is employed, the effective amount of the core monomer for producing the core binder is then reduced accordingly.

Magnetic pressure fixable microcapsule toner compositions generally comprise from about 25 to about 70 percent by weight, preferably from about 40 to about 60 percent by weight, of magnetic pigments; from about 5 to about 30 percent by weight, preferably from about 5 to about 20 percent by weight, of polymeric shell; from about 5 to about 40 percent by weight, preferably from about 10 to about 30 percent by weight, of the core polymer; and from about 0.01 to about 20 percent by weight, preferably from about 0.1 to about 15 percent by weight, of the polyfunctional reagent.

An example of a process of the present invention for preparation of color heat fusible microcapsule toner compositions entails:

(1) preparing a core component comprising
(a) selected pigment particles, such as Hostaperm Pink E, in an amount of about 7 percent by weight of the toner, wherein the pigment is flushed into a resin comprising a styrene-n-butyl-methacrylate copolymer (about 65 percent styrene and about 35 percent n-butyl methacrylate), which resin is present in an amount approximately equal to the amount (by weight) of the pigment particles;

(b) a preformed polymer, for example a styrene-n-butyl methacrylate copolymer (about 52 percent by weight of styrene and about 48 percent by weight of n-butyl methacrylate), present in an amount such that the total percent by weight of this preformed polymer plus the preformed polymer into which the pigment has been flushed is about 10 percent by weight of the core monomer/polymer mixture component of the toner;

(c) a core monomer or mixture of monomers, present in an amount of about 65 percent by weight of the core monomer/polymer mixture components of the toner, wherein the total amount of monomers plus preformed polymers is about 78 percent by weight of the toner;

(d) an initiator or initiators, present in an amount of from about 0.5 to about 6 percent by weight of the core monomer, and preferably from about 2 to about 4 percent by weight of the core monomer, for a low temperature reacting initiator and from about 0 to about 2 percent by weight of the core monomer, and preferably from about 0.5 to about 1.25 percent by weight of the core monomer, of a higher temperature reacting initiator;

(e) an oil soluble shell monomer dissolved in the core monomers, present in an amount of from about 5 percent by weight to about 30 percent by weight and more preferably from about 10 percent to about 20 percent by weight of the toner; and (f) an oil soluble polyfunctional reagent dissolved in the core monomers, present in an amount of from about 0.01 percent by weight to about 20 percent by weight and more preferably from about 0.1 percent to about 5 percent by weight of the toner;

(2) dispersing the resulting homogeneous mixture into a water phase containing a surfactant or emulsifier and, optionally, a base and/or an anti-foaming component such as an aliphatic alcohol such as 2-decanol;

(3) adding a water soluble second shell component in an amount of from about 10 percent to about 20 percent by weight, provided that the total oil soluble and water soluble shell monomer(s) is 20 percent by weight of the toner composition, to the dispersion while maintaining mechanical agitation at room temperature, thus effecting interfacial polycondensation;

(4) after about 1 hour, the temperature of the reaction medium is raised to a temperature of from about 50° C. to about 130° C. and preferably from about 60° C. to about 95° C. for about 8 hours to about 24 hours, thereby effecting free radical polymerization of the core monomer, and effecting grafting of some resulting core binder to the shell;

(5) thereafter washing the toner thus formed to removed the surfactants; and (6) subsequently drying the final toner product, preferably employing a fluidized bed drying process.

A surfactant or emulsifier is generally added to disperse the organic mixture in the form of toner size microdroplets in the aqueous medium and for stabilization of these droplets against coalescence or agglomeration prior to shell formation and encapsulation of the core. Many types of surfactants can be employed, such as polyvinylalcohol, polyethylene sulfonic acid salt, polyvinylsulfate ester salt, carboxylated polyvinylalcohol, water soluble block copolymers, gum arabic, polyacrylic acid salt, carboxymethylcellulose, hydroxypropylcellulose, hydroxyethylcellulose, Tylose (Fluka), Methocel (Dow Chemical Co.), quaternary amine functionalized cellulose derivatives, block copolymers of propylene oxide and ethylene oxide, gelatin, phthalated gelatin and succinated gelatin salts of alginic acid. In addition, water soluble inorganic salts may also be employed to stabilize the dispersion, such as trisodium polyphosphate, tricalcium polyphosphate, and the like.

Examples of interfacial polymerization processes suitable for formation of the polymeric shell are illustrated in U.S. Pat. Nos. 4,000,087 and 4,307,169, the disclosure of which is incorporated by reference.

The pressure required to rupture the microcapsular electroscopic marking particles in accordance with this invention depends mainly on the size of the microcapsule; and on the thickness and robustness of the shell. It will be obvious that relatively large and thin shell capsules are easier to rupture by pressure than those of smaller size, as a general rule. The capsule size can be precisely controlled by the selection of appropriate speed of stirring or mixing during the aforementioned step of dispersion and emulsification.

In a particular embodiment of this invention, the interfacial polycondensation reaction may be directed to fabrication of vinyl group-containing polyurea or polyurethane shells. This reaction utilizes a commercially available vinyl containing isocyanate (TMI) of the following formula:

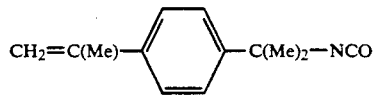

The vinyl isocyanate and a diisocyanate in a weight ratio of about 1/99 to about 20/80 or preferably about 1/99 to about 10/90 are used as the oil soluble shell monomers. The water soluble shell monomers can be selected from diamines and bisphenols. Interfacial condensation of the oil and water soluble monomers will give vinyl terminated polyureas and polyurethanes such as those below:

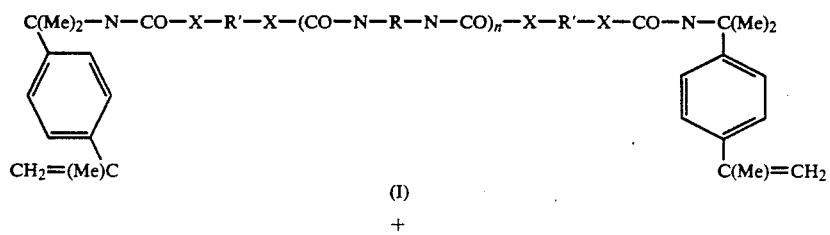

(I)

+

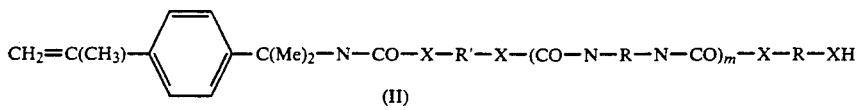

(II)

where

X-R'-X corresponds to the water-soluble shell monomer(s) moiety employed in the shell formation;
N-R-N corresponds to the oil soluble shell monomer moiety employed in the shell formation;
and n and m represent the degree of polymerization and are from about 1 to about 10,000.

The vinyl groups on the resulting shell polymer will then participate in the core polymerization with the core monomers, thus achieving the chemical binding of the core binder molecules onto the shell structure.

Two types of prepolymers are employed in this embodiment. Prepolymer I which contains two vinyl end groups is likely to give an ABA type triblock polymer after core polymerization, wherein A and B define segments of the resulting polymer. Prepolymer II will result in an AB diblock polymer. In either case, the B segment is essentially the polymer I or II, and the A segment will have the structure of the core polymer. As a result, A segments may act like anchoring or compatibilizing segments which could improve the core-shell compatibility and the overall-particle integrity and impermeability.

In another embodiment of this invention, vinyl terminated polyurea, polyurethane, polyester or polyamide shell polymers can be prepared by utilizing vinyl containing phenols, such as p-hydroxystyrene, m-hydroxystyrene and p-hydroxyphenyl methacrylamide, or vinyl containing amines such as aminostyrene and methacrylamide. A vinyl phenol and a bisphenol (or a vinyl amine and a diamine) in a weight ratio of about 5/95 to about 20/80 are used as the water soluble shell monomers. The oil soluble shell monomers can be selected from polyisocyanates or polyacyl halides.

Another embodiment of this invention relates to the utilization of a suitable polyfunctional reagent which bears reactive end-groups to enable achieving the linking of core binder to the shell polymer. In a preferred embodiment, the polyfunctional reagents contain a polysiloxane moiety. The presence of the low-surface energy polysiloxane groups can eliminate tendencies of the toner material to agglomerate and undergo blocking, as well as alleviate the image offset problem. The toner fixing characteristics are enhanced by the presence of the polysiloxane moiety. In principle, any bifunctional reagent having a reactive group capable of polymerizing with the shell and/or monomers or prepolymers can be effective to bring about the necessary grafting. However, to enhance the toner's fixing properties and to remove the toner's image offset problem, the bifunctional reagent should also contain within its structure low surface energy materials such as, for example, polysiloxanes, perfluorocarbons or polyethers.

Generally, such bifunctional monomers or prepolymers suitable to achieve the objectives of the present invention include a polysiloxane such as illustrated in structure (III), or a polyether such as illustrated in structure (IV), or a perfluorocarbon such as illustrated in structure (V). Y can be a methacryloxy, acryloxy or other functionality capable of reacting with core monomer(s) or prepolymers; X is an hydroxy, amino, thiol, or isocyanato moiety capable of reacting with the shell monomer(s) or prepolymer(s); and n represents the number of repeating segments, and is generally from about 1 to about 5000 units.

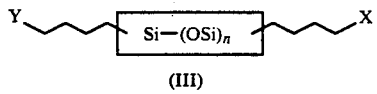

(III)

Y—(CH$_2$CH$_2$—O)$_n$—X (IV)

Y—(CF$_2$CF$_2$)$_n$—X (V)

The invention will further be illustrated in the following, non-limiting examples, it being understood that these examples are intended to be illustrative only and that the invention is not intended to be limited to the materials, conditions, process parameters and the like recited herein.

COMPARATIVE EXAMPLE

The following comparative example illustrates the preparation of a 17 micron magnetic microcapsule pressure fixable toner comprised of a poly-urea shell, a core of poly(lauryl methacrylate), and iron oxide pigment.

A mixture of lauryl methacrylate (113.0 grams, available as Rocryl 320 from Rohm and Haas), Isonate 143 L (47.0 grams, available from Upjohn Chem. Co.), Vazo 52 (1.6 grams), and Vazo 64 (1.6 grams) is thoroughly mixed at 4,000 rpm using an IKA T-50 polytron with a G45/M probe for 30 seconds. To this is added iron oxide (300 grams, Bayferrox 8610, available from Mobay), and the mixture is blended at 8,000 rpm for 3 to 5 minutes. To the resulting slurry is then added one liter of a 0.10% aqueous poly(vinyl alcohol) solution (Mw=96,000, 88% hydroxylated), and the product is subsequently homogenized at 9,000 rpm for 2 minutes. The resulting dispersion is transferred to a two liter kettle equipped with a mechanical stirrer. Bis-(3-aminopropyl)-piperazine (33.0 grams) is then added to the flask, and the resulting mixture is stirred for one hour at room temperature. Subsequently, the reaction mixture is heated in an oil bath, with the temperature of the bath being raised from ambient temperature to 90° C. over a period of 45 minutes and then held at this temperature for an additional 6 hours. After cooling to room temperature, the encapsulated particle product is allowed to settle to the bottom of the reaction kettle by gravity, and the aqueous portion is decanted off. This latter washing procedure is repeated six times, until the aqueous phase is clear. The wet encapsulated particles are sieved through a 180 micron screen, diluted to 10 parts of water containing 18 grams of Aquadaq E (Acheson Colloids) spray-dried, and the resulting suspension is subjected to spray-drying, whereby 350 grams of black microcapsule toner material are obtained as a free flowing powder. The resulting dry toner is then sieved through a 63 micron screen.

A mixture of 120.0 grams of the above encapsulated particles and 0.8 grams of carbon black (BP200, Cabot Chem. Co.) is dry blended in a Lightnin CBM dry blender at 3,000 rpm for 2 minutes, followed by the addition of 3.3 grams of zinc stearate followed by additional dry blending for six minutes at 3000 rpm. The resulting dry blended toner is then sieved through a 63 micron screen and measured to exhibit a volume average particle diameter of 17.2 microns and a particle size distribution of 1.33 as determined by the Coulter Counter Model ZM, available from Coulter Electronics, Inc.

The volume resistivity of the toner is measured by gently filling a 1 cm$^3$ cell sitting on a horseshoe magnet with the above powdered toner sample. Two opposite walls of the cell are comprised of 1 centimeter×1 centimeter conductive metal plates. The other two walls and the bottom of the cell are also 1 centimeter×1 centimeter in dimension, but are comprised of insulating material. A voltage of 10 volts is applied across the plates, and the current flowing through the plates is measured using an electrometer. The device is standardized using a nickel standard whose saturation magnetic moment is known (55 emu/gram). The nickel sample is magnetized between two magnetic pole faces with a saturating magnetic field of 2,000 Gauss, such that the induced magnetic field is perpendicular to one of the faces of the cell. The integrated current that is induced when the nickel sample is removed from the saturating magnetic field is measured. Next, the integrated current induced by a toner sample under identical conditions is also measured. The encapsulated toner saturation magnetic moment is then obtained by referencing its induced current per gram of sample to that of the nickel sample. For the toner of this example, the saturation magnetic moment is measured to be 52 emu per gram, and its volume resistivity is measured to be $5 \times 10^5$ ohm-cm.

The above prepared toner is evaluated in a Xerox 4060 ™ printer. The toned images are transfixed onto paper with a transfix pressure of 2,000 psi. Print quality is evaluated from a checkerboard print pattern. The image optical density is measured with a standard integrating densitometer. Image fix is measured by the standardized scotch tape pull method, and is expressed as a percentage of the retained image optical density after the tape test relative to the original image optical density. Image smearing is evaluated qualitatively by hand rubbing the fused checkerboard print using a blank paper under an applied force for a specific cycle time, and viewing the surface cleanliness of nonprinted and printed areas of the page. Image ghosting on paper is evaluated visually. For the above comparative toner, the image fix level is 84 percent, and image smear and image ghosting are observed in this machine testing from the initial prints and are persistent to at least 2000 prints. The toner displays no resistance to agglomeration over several weeks of storage, and displays severe agglomeration or blocking tendency when heated at 55° C. for 48 hours.

EXAMPLE I

The following example illustrates the preparation of a 19 micron pressure fixable magnetic microcapsule toner using the polyfunctional reagent, 1-(1-isocyanato-1-methylethyl)-3-(1-methylethenyl)-benzene available from Cyanamid as TMI (meta).

A mixture of lauryl methacrylate (112.0 grams, available as Rocryl 320 from Rohm and Haas), 1-(1-isocyanato-1-methylethyl)-3-(1-methylethenyl)-benzene (0.5 grams, available from Cyanamid as TMI-meta), Isonate 143 L (47.0 grams), Vazo 52 (1.6 grams), and Vazo 64 (1.6 grams) is thoroughly mixed at 4,000 rpm using an IKA T-50 polytron with a G45/M probe for 30 seconds. To this is added iron oxide (300 grams, Bayferrox 8610, available from Mobay), and the mixture is blended at 8,000 rpm for 3 to 5 minutes. To the resulting slurry is then added one liter of a 0.10% aqueous poly(vinyl alcohol) solution (Mw=96,000, 88% hydroxylated), and the product is subsequently homogenized at 9,000 rpm for 2 minutes. The resulting dispersion is transferred to a two liter kettle equipped with a mechanical stirrer. Bis(3-aminopropyl)piperazine (33.0 grams) is then added to the flask, and the resulting mixture is stirred for one hour at room temperature. Subsequently, the reaction mixture is heated in an oil bath, with the temperature of the bath being raised from ambient temperature to 90° C. over a period of 45 minutes and then held at this temperature for an additional 6 hours. After cooling to room temperature, the encapsulated particle product is allowed to settle to the bottom of the reaction kettle by gravity, and the aqueous portion is decanted off. This latter washing procedure is repeated six times, until the aqueous phase is clear. The wet encapsulated particles are sieved through a 180 micron screen, diluted to 10 parts of water containing 18 grams of Aquadaq E (Acheson Colloids) spray-dried, and the resulting suspension is subjected to spray-drying, whereby 360 grams of black microcapsule toner material are obtained as a free flowing powder. The resulting dry toner is then sieved through a 63 micron screen.

A mixture of 120.0 grams of the above encapsulated particles and 0.8 grams of carbon black (BP200, Cabot Chem. Co.), is dry blended in a Lightnin CBM dry blender at 3,000 rpm for 2 minutes, followed by the addition of 3.3 grams of zinc stearate and subsequent dry blending for six minutes at 3000 rpm. The volume resistivity of this toner, as measured by the procedure given in the Comparative Example, is $4.0 \times 10^5$ ohm-cm and the magnetic saturation is 49 emu/gram. The average volume particle size is measured to be 19 microns with a particle size distribution of 1.36.

The above prepared toner of Example I is evaluated in a Xerox 4060 ™ printer, using similar conditions and evaluation methods as described in the Comparative Example. The toner of Example I displays an image fix level of 80 percent, and no image smear and no image ghosting are observed in this machine testing from the initial prints to at least 2000 prints. The toner displays resistance to agglomeration over several months of storage, and displays no agglomeration or blocking tendency when heated at 55° C. for 48 hours.

EXAMPLE II

The following example illustrates the preparation of a 17 micron pressure fixable magnetic microcapsule toner using the polyfunctional reagent, 2-isocyanatoethylmethacrylate.

A mixture of lauryl methacrylate (112.5 grams, available as Rocryl 320 from Rohm and Haas), 2-isocyanato-ethyl-methacrylate (0.50 grams), Isonate 143 L (42.0 grams), Desmodur E-21 (5.7 grams), Vazo 52 (1.6 grams) and Vazo 64 (1.6 grams) is thoroughly mixed at 4,000 rpm using an IKA T-50 polytron with a G45/M probe for 30 seconds. To this is added iron oxide (300 grams, Bayferrox 8610, available from Mobay), and the mixture is blended at 8,000 rpm for 3 to 5 minutes. To the resulting slurry is then added one liter of a 0.11% aqueous poly(vinyl alcohol) solution (Mw=96,000, 88% hydroxylated), and the product is subsequently homogenized at 9,000 rpm for 2 minutes. The resulting dispersion is transferred to a two liter kettle equipped with a mechanical stirrer. Bis(3-aminopropyl)piperzine (33.0 grams) is then added to the flask, and the resulting mixture is stirred for one hour at room temperature. Subsequently, the reaction mixture is heated in an oil bath, with the temperature of the bath being raised from ambient temperature to 90° C. over a period of 45 minutes and the reactive mixture is held at this temperature for an additional 6 hours. After cooling to room temperature, the encapsulated particle product is allowed to settle to the bottom of the reaction kettle by gravity, and the aqueous portion is decanted off. This latter washing procedure is repeated six times, until the aqueous phase is clear. The wet encapsulated particles are sieved through a 180 micron screen, diluted to 10 parts of water containing 18 grams of Aquadaq E (Acheson Colloids) spray-dried, and the resulting suspension is subjected to spray-drying, whereby 355 grams of black microcapsule toner material are obtained as a free flowing powder. The resulting dry toner is sieved through a 63 micron screen.

A mixture of 120.0 grams of the above encapsulated particles and 0.8 grams of carbon black (BP200, Cabot Chem. Co.) is dry blended in a Lightnin CBM dry blender at 3,000 rpm for 2 minutes, followed by the addition of 3.3 grams of zinc stearate followed by additional dry blending for six minutes at 3000 rpm. The volume resistivity of this toner, as measured by the procedure given in the Comparative Example, is $3.0 \times 10^5$ ohm-cm, and the magnetic saturation is 48 emu/gram. The volume average particle size is measured to be 17 microns with a particle size distribution of 1.32.

The above prepared toner of Example II, is evaluated in a Xerox 4060 ™ printer, using similar conditions and evaluation methods as described in the Comparative Example. The toner of Example II displays an image fix level of 75 percent, and no image smear and no image ghosting are observed in this machine testing from the initial prints to at least 2000 prints. The toner displays resistance to agglomeration over several months of storage, and displays no agglomeration or blocking tendency when heated at 55° C. for 48 hours.

EXAMPLE III

The following example illustrates the preparation of a 15 micron pressure fixable magnetic microcapsule toner using the polyfunctional reagent, 2-isocyanatoethylmethacrylate.

A mixture of lauryl methacrylate (112.5 grams, available as Rocryl 320 from Rohm and Haas), 2-isocyanatoethyl-methacrylate (0.50 grams), Vibrathane-146 (47 grams, available from Uniroyal Canada), Vazo 52 (1.6 grams) and Vazo 64 (1.6 grams) is thoroughly mixed at 4,000 rpm using an IKA T-50 polytron with a G45/M probe for 30 seconds. To this is added iron oxide (300 grams, Bayferrox 8610, available from Mobay), and the mixture is blended at 8,000 rpm for 3 to 5 minutes. To the resulting slurry is then added one liter of a 0.12% aqueous poly(vinyl alcohol) solution (Mw=96,000, 88% hydroxylated), and the mixture is subsequently homogenized at 9,000 rpm for 2 minutes. The resulting dispersion is transferred to a two liter kettle equipped with a mechanical stirrer. Dytek A (22.0 grams) is then added to the flask, and the resulting mixture is stirred for one hour at room temperature. Subsequently, the reaction mixture is heated in an oil bath, with the temperature of the bath being raised from ambient temperature to 90° C. over a period of 45 minutes, and then held at this temperature for an additional 6 hours. After cooling to room temperature, the encapsulated particle product is allowed to settle to the bottom of the reaction kettle by gravity, and the aqueous portion decanted off. This latter washing procedure is repeated six times until the aqueous phase is clear. The wet encapsulated particles are sieved through a 180 micron screen, diluted to 10 parts of water containing 18 grams of Aquadaq E (Acheson Colloids), spray-dried, and the resulting suspension is subjected to spray-drying, whereby 355 grams of black microcapsule toner material are obtained as a free flowing powder. The resulting dry toner is then sieved through a 63 micron screen.

A mixture of 120.0 grams of the above encapsulated particles and 0.8 grams of carbon black (BP200, Cabot Chem. Co.) is dry blended in a Lightnin CBM dry blender at 3,000 rpm for 2 minutes, followed by the addition of 3.3 grams of zinc stearate and subsequent dry blending for six minutes at 3000 rpm. The volume resistivity of this toner, as measured by the procedure given in the Comparative Example, is $3.0 \times 10^5$ ohm-cm and the magnetic saturation is 48 emu/gram. The volume average particle size is measured to be 15 microns with a particle size distribution of 1.32.

The above prepared toner of Example III, is evaluated in a Xerox 4060 ™ printer using similar conditions and evaluation methods as described in the Comparative Example. The toner of Example III displayed an image fix level of 77 percent, and no image smear and no image ghosting are observed in this machine testing from the initial prints to at least 2000 prints. The toner displays resistance to agglomeration over several months of storage, and displays no agglomeration or blocking tendency when heated at 55° C. for 48 hours.

EXAMPLE IV

The following example illustrates the preparation of a 16 micron pressure fixable magnetic microcapsule toner using the polyfunctional polysiloxane of structure III, wherein Y is a methacryloxy function, and X is an amino function.

To 3-aminopropyl terminated polydimethylsiloxane (13 grams, Mw=2,500, available from Pertrarch) is added methacryloyl chloride (0.54 grams), followed by triethylamine (0.5 grams), and this mixture is stirred at room temperature overnight. To the above mixture are then added lauryl methacrylate (100 grams, available as Rocryl 320 from Rohm and Haas), 2-isocyanatoethylmethacrylate (0.50 grams), Isonate 143L (47 grams, available from Upjohn Chem. Co.), Vazo 52 (1.6 grams) Vazo 64 (1.6 grams), and this mixture is thoroughly mixed at 4,000 rpm using an IKA T-50 polytron with a G45/M probe for 30 seconds. To this mixture is added iron oxide (300 grams, Bayferrox 8610, available from Mobay), and the mixture is blended at 8,000 rpm for 3 to 5 minutes. To the resulting slurry is then added one liter of a 0.11% aqueous poly(vinyl alcohol) solution (Mw=96,000, 88% hydroxylated), and this mixture is subsequently homogenized at 9,000 rpm for 2 minutes. The resulting dispersion is transferred to a two liter kettle equipped with a mechanical stirrer. Dytek A (21.5 grams) is then added to the flask, and the resulting mixture is stirred for one hour at room temperature. Subsequently, the reaction mixture is heated in an oil bath, with the temperature of the bath being raised from ambient temperature to 90° C. over a period of 45 minutes, and the reaction mixture is held at this temperature for an additional 6 hours. After cooling to room temperature, the encapsulated particle product is allowed to settle to the bottom of the reaction kettle by gravity, and the aqueous portion is decanted off. This latter washing procedure is repeated six times until the aqueous phase is clear. The wet encapsulated particles are sieved through a 180 micron screen, diluted to 10 parts of water containing 18 grams of Aquadaq E (Acheson Colloids) spray-dried, and the resulting suspension is subjected to spray-drying, whereby 365 grams of black microcapsule toner material are obtained as a free flowing powder. The resulting dry toner is sieved through a 63 micron screen.

A mixture of 120.0 grams of the above encapsulated particles and 0.8 grams of carbon black (BP200, Cabot Chem. Co.) is dry blended in a Lightnin CBM dry blender at 3,000 rpm for 2 minutes, followed by the addition of 3.3 grams of zinc stearate and subsequent dry blending for six minutes at 3000 rpm. The volume resistivity of this toner, as measured by the procedure given in the Comparative Example, is $6.0 \times 10^5$ ohm-cm, and the magnetic saturation is 50 emu/gram. The volume average particle size is measured to be 16 microns with particle size distribution of 1.30.

The above prepared toner of Example IV, is evaluated in a Xerox 4060 ™ printer, using similar conditions and evaluation methods as described in the Comparative Example. The toner of Example IV, displays an image fix level of 87 percent. No image smear and no image ghosting are observed in machine testing from the initial prints to at least 2000 prints. The toner displays resistance to agglomeration over several months of storage, and displays no agglomeration or blocking tendency when heated at 55° C. for 48 hours.

EXAMPLE V

The following example illustrates the preparation of a 15 micron pressure fixable magnetic microcapsule toner using the polyfunctional polysiloxane of structure III, wherein Y is a methacryloxy function, and X is an amino function.

To 3-aminopropyl terminated polydimethylsiloxane (13 grams, Mw=27,000, available from Petrarch) is added methacryloyl chloride (0.05 grams), followed by triethylamine (0.05 grams), and this mixture is stirred at room temperature overnight. To the above mixture are then added lauryl methacrylate (100 grams, available as Rocryl 320 from Rohm and Haas), 2-isocyanatoethyl-methacrylate (0.50 grams), Isonate 143L (47 grams, available from Upjohn Chem. Co.) and Vazo 52 (1.6 grams), Vazo 64 (1.6 grams), and this mixture is thoroughly mixed at 4,000 rpm using an IKA T-50 polytron with a G45/M probe for 30 seconds. To this mixture is added iron oxide (300 grams, Bayferrox 8610, available from Mobay), and the mixture is blended at 8,000 rpm for 3 to 5 minutes. To the resulting slurry is then added one liter of a 0.12% aqueous poly(vinyl alcohol) solution (Mw=96,000, 88% hydroxylated), and the mixture is subsequently homogenized at 9,000 rpm for 2 minutes. The resulting dispersion is transferred to a two liter kettle equipped with a mechanical stirrer. Dytek A (21.5 grams) is then added to the flask, and the resulting mixture is stirred for one hour at room temperature. Subsequently, the reaction mixture is heated in an oil bath, with the temperature of the bath being raised from ambient temperature to 90° C. over a period of 45 minutes, and the reaction mixture is held at this temperature for an additional 6 hours. After cooling to room temperature, the encapsulated particle product is allowed to settle to the bottom of the reaction kettle by gravity, and the aqueous portion is decanted off. This latter washing procedure is repeated six times until the aqueous phase is clear. The wet encapsulated particles are sieved through a 180 micron screen, diluted to 10 parts of water containing 18 grams of Aquadaq E (Acheson Colloids) spray-dried, and the resulting suspension is subjected to spray-drying, whereby 363 grams of black microcapsule toner material are obtained as a free flowing powder. The resulting dry toner is then sieved through a 63 micron screen.

A mixture of 120.0 grams of the above encapsulated particles and 0.8 grams of carbon black (BP200, Cabot Chem. Co.) is dry blended in a Lightnin CBM dry blender at 3,000 rpm for 2 minutes, followed by the addition of 3.3 grams of zinc stearate and subsequent dry blending of six minutes at 3000 rpm. The volume resistivity of this toner, as measured by the procedure given in the Comparative Example, is $2.0 \times 10^5$ ohm-cm, and the magnetic saturation is 51 emu/gram. The volume average particle size is measured to be 15 microns with particle size distribution of 1.31.

The above prepared toner of Example V, is evaluated in a Xerox 4060 ™ printer, using similar conditions and evaluation methods as described in the Comparative Example. The toner of Example V displays an image fix level of 85 percent. No image smear and no image ghosting are observed in machine testing from the initial prints to at least 2000 prints. The toner displays resistance to agglomeration over several months of storage, and displays no agglomeration or blocking tendency when heated at 55° C. for 48 hours.

EXAMPLE VI

The following example illustrates the preparation of an 11 micron heat fusible colored microcapsule toner using the polyfunctional reagent, 2-isocyanatoethylmethacrylate.

A mixture of lauryl methacrylate (103 grams, available as Rocryl 320 from Rohm and Haas), 2-isocyanato-ethyl-methacrylate (0.50 grams), tetramethylxylene diisocyanate (35 grams, available from Cyanamid as TMXDI), Vazo 52 (1.6 grams), Vazo 64 (1.6 grams), and Heliogen blue pigment (4.5 grams, available from BASF) is thoroughly mixed at 4,000 rpm using an IKA T-50 polytron with a G45/M probe for 30 seconds. To the resulting slurry is then added one liter of a 1% aqueous tylose (available from Fluka) solution and subsequently homogenized at 10,000 rpm for 2 minutes. The resulting dispersion is transferred to a two liter kettle equipped with a mechanical stirrer. Dytek A (14.0 grams) is then added to the flask, and the resulting mixture is stirred for one hour at room temperature. Subsequently, the reaction mixture is heated in an oil bath, with the temperature of the bath being raised from ambient temperature to 90° C. over a period of 3 hours, and the reaction mixture is held at this temperature for an additional 3 hours. After cooling to room temperature, the encapsulated particle product is removed by centrifugation, and the toner particles are repeatedly washed by suspension in water followed by centrifugation until the aqueous phase is clear. The wet encapsulated particles are sieved through a 180 micron screen, concentrated by centrifugation and freeze-dried. The resulting dry toner product (190 grams) of cyan microcapsule toner material is obtained as a free flowing powder. The resulting dry toner is then sieved through a 63 micron screen using a mechanical sieve shaker available from CSC Scientific Co. The volume average particle size of this toner is found to be 11 microns with particle size distribution of 1.32.

A mixture of 50 grams of the above encapsulated particles and 0.25 grams of Aerosil R812 is dry blended in a Lightnin CBM dry blender at 3,000 rpm for 5 minutes. A 1 kilogram developer composition comprised of 3 percent by weight of the above cyan toner (30 grams) with the Xerox 1075 magnetic carrier (970 grams) is prepared by roll milling the two components for 30 minutes.

Xerographic images are then produced using the Xerox 1075 printer, initially yielding excellent copy quality images which persisted up to at least 2000 print cycles, with no background, and no offsetting phenomena observed. The toner displays resistance to agglomeration over several months of storage, and displays no agglomeration or blocking tendency when heated at 55° C. for 48 hours.

EXAMPLE VII

The following example illustrates the preparation of a 7 micron heat fusible colored microcapsule toner using the polyfunctional polysiloxane of structure III, wherein Y is a methacryloxy function, and X is an amino function.

To 3-aminopropyl terminated polydimethylsiloxane (13 grams, Mw=27,000 available from Pertrarch) is added methacryloyl chloride (0.05 grams), followed by triethylamine (0.05 grams), and this mixture is stirred at room temperature overnight. To the above mixture is then added lauryl methacrylate (103 grams, available as Rocryl 320 from Rohm and Haas), stearyl methacrylate (69.3 grams), Desmodur W (35 grams, available from Mobay), Vazo 52 (1.6 grams), Vazo 64 (1.6 grams), and lithol scarlet pigment (4.5 grams, available from BASF) and this mixture is thoroughly mixed at 4,000 rpm using an IKA T-50 polytron with a G45/M probe for 30 seconds. To the resulting slurry is then added one liter of a 1% aqueous tylose (available from Fluka) solution, sodium dodecane-sulfate (0.20 grams, available from Fluka) and this mixture is subsequently homogenized at 10,000 rpm for 2 minutes. The resulting dispersion is transferred to a two liter kettle equipped with a mechanical stirrer. Dytek A (14.0 grams) is then added to the flask, and the resulting mixture is stirred for one hour at room temperature. Subsequently, the reaction mixture is heated in an oil bath, with the temperature of the bath being raised from ambient temperature to 90° C. over a period of 3 hours, and the reaction mixture is held at this temperature for an additional 3 hours. After cooling to room temperature, the encapsulated particle product is removed by centrifugation, and the toner particles are repeatedly washed by suspension in water followed by centrifugation until the aqueous phase is clear. The wet encapsulated particles are sieved through a 180 micron screen, concentrated by centrifugation and freeze-dried. The resulting dry toner product (195 grams) of red microcapsule toner material is obtained as a free flowing powder. The resulting dry toner is then sieved through a 63 micron screen using a mechanical sieve shaker available from CSC Scientific Co. The volume average particle size of this toner is found to be 7 microns with particle size distribution of 1.33.

A mixture of 50 grams of the above encapsulated particles and 0.25 grams of Aerosil R812, is dry blended in a Lightnin CBM dry blender at 3,000 rpm for 5 minutes. A 1 kilogram developer composition comprised of 3 percent by weight of the above red toner (30 grams) with the Xerox 9200 magnetic carrier (970 grams) is prepared by roll milling the two components for 30 minutes.

Xerographic images are then produced using the Xerox 9200 printer, yielding excellent copy quality images which persists up to at least 2000 print cycles, with no background, and no offsetting phenomena observed. The toner displays resistance to agglomeration over several months of storage, and displays no agglomeration or blocking tendency when heated at 55° C. for 48 hours.

While the invention has been described with reference to particular preferred embodiments, the invention is not limited to the specific examples given, and other embodiments and modifications can be made by those skilled in the art without departing from the spirit and scope of the invention.

What is claimed is:

1. A microcapsule toner, consisting essentially of
   a core comprising a colorant and a binder polymer; and
   a shell surrounding said core and comprising a shell polymer;
   wherein a part of said binder polymer is chemically grafted to said shell polymer via a spacer linkage which is a reaction product of a polyfunctional reagent with precursors of said binder polymer and said shell polymer.

2. A toner according to claim 1, wherein a layer of said binder polymer is chemically bonded to an inner surface of said shell.

3. A toner according to claim 1, wherein the binder polymer is selected from the group consisting of acrylate polymers, methacrylate polymers, styrene and styrene polymers; and the shell polymer is selected from the group consisting of polyureas, polyether-ureas, polyurethanes, polyamides, polyesters, and mixtures thereof.

4. A toner according to claim 3, wherein the binder polymer is an acrylate copolymer, a methacrylate copolymer, or a styrene copolymer.

5. A toner according to claim 1, wherein the polyfunctional reagent comprises at least one condensation functionality and at least one free radical polymerizable functionality.

6. A toner according to claim 5, wherein the condensation functionality is NCO, COCl, COBr, OCOCl, OH, or $NH_2$; and the free radical polymerizable functionality is a vinyl group.

7. A toner according to claim 1, wherein the shell polymer is a polyurea, and the binder polymer is an alkyl methacrylate polymer.

8. A toner according to claim 1, wherein the shell polymer is a polyurea, and the binder polymer is an alkyl acrylate polymer.

9. A toner according to claim 1, wherein the shell polymer is a polyurea, and the binder polymer is an acrylate or methacrylate copolymer.

10. A toner according to claim 1, wherein the toner contains surface additives.

11. A toner according to claim 10, wherein the surface additives are selected from the group consisting of conductive additives, flow aids and surface release agents.

12. A toner according to claim 10, wherein the surface additives are selected from the group consisting of carbon colloidal silica, and zinc stearate.

13. A toner according to claim 1, wherein said polyfunctional reagent is selected from the group consisting of isocyanato-ethyl methacrylate, 2-isocyanato-ethyl acrylate, 3-isocyanato-propyl methacrylate, 3-isocyanatopropyl acrylate, isocyanato-butyl methacrylate, isocyanato-butyl acrylate, isocyanato-pentyl methacrylate, isocyanato-pentyl acrylate, isocyanato-hexyl methacrylate, isocyanato-hexyl methacrylate, isocyanato-heptyl methacrylate, isocyanato-heptyl acrylate, isocyanato-octyl methacrylate, isocyanato-octyl acrylate, isocyanato-lauryl methacrylate, isocyanato-dodecane methacrylate, m-isocyanato-styrene, p-isocyanato-styrene, o-isocyanatostyrene, m-isocyanato-alpha-methyl styrene, o-isocyanato-alpha-methyl styrene, p-isocyanato-alpha-methyl styrene, (3-isocyanato-phenyl)-methacrylate, (2-isocyanato-phenyl)-methacrylate, (4-iso-cyanato-phenyl)-methacrylate, (3-isocyanato-phenyl)-acrylate, 2-amino-ethyl acrylate, 3-amino-propyl methacrylate, 3-amino-propyl acrylate, amino-butyl methacrylate, amino-butyl acrylate, amino-pentyl methacrylate, amino-pentyl acrylate, amino-hexyl methacrylate, amino-hexyl acrylate, amino-heptyl methacrylate, amino-heptyl acrylate, amino-octyl methacrylate, amino-octyl acrylate, amino-lauryl methacrylate, amino-dodecane methacrylate, 2-(2-amino-ethyl) acrylate, 3-amino-propyl methacrylate, 3-amino-propyl acrylate, amino-butyl methacrylate, amino-butyl acrylate, amino-pentyl methacrylate, amino-pentyl acrylate, amino-hexyl methacrylate, amino-hexyl methacrylate, amino-heptyl methacrylate, amino-heptyl acrylate, amino-octyl methacrylate, amino-octyl acrylate, amino-lauryl methacrylate, amino-dodecane methacrylate, and 1-(1-isocyanato-1-methylethyl)-3-(1-methylethenyl)-benzene.

14. A toner according to claim 1, wherein said polyfunctional reagent is selected from the group consisting of Bis-N,N'(2-hydroxyethyl) methacrylamide, Bis-N,N'(2-hydroxyethyl) acrylamide, Bis-N,N'(3-hydroxypropyl) methacrylamide, Bis-N,N'(3-hydroxypropyl) styrene, 2,3-diisocyanato-styrene, 2,5-diisocyanatostyrene, 3,5-diisocyanato-styrene, 2,3-diisocyanato-alpha-methylstyrene, 2,4-diisocyanato-alpha-methylstyrene, 2,5-diisocyanato-alpha-methylstyrene, 3,5-diisocyanato-alpha-methylstyrene, 3,5-diisocyanato-alpha-methylstyrene, Bis(N-ethyl-2-methacrylamido) amine, Bis(N-ethyl-2-acrylamido) amine, 2,4-diaminostyrene, 2,5-diaminostyrene, 3,5-diaminostyrene, 2,3-diaminostyrene, 2,4-diamino-alpha-methyl-styrene, 2,5-diamino-alpha-methyl-styrene, 3,5-diamino-alpha-methyl-styrene, 2,3-diamino-alpha-methyl-styrene, N-acryloyltris-(hydroxymethyl)-amino methane, 1,3-dimethacryloyl-4,6-diisocyanatobenzene, and 1,3-dimethaoryloyl-4,6-diamino-benzene.

15. A toner according to claim 1, wherein the polyfunctional reagent is represented by the formula

Y-R-X wherein
R is selected from the group consisting of polyalkylene, polysiloxane, polyether, and perfluorocarbon moieties;

Y is methacryloxy, acryloxy, metharylamido, acrylamido or styryl; and
X is —OH, —NH$_2$, —NCO, —COCl, —OCOCl or epoxy.

16. A toner according to claim 1, wherein the polyfunctional reagent is

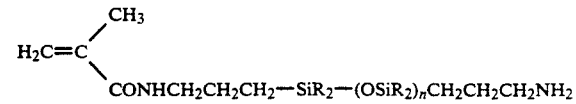

wherein R is an alkyl group and n=10–1000.

17. A toner according to claim 1, wherein the toner comprises a volume particle size of from 7–19 microns.

18. The toner of claim 1, wherein the microcapsule toner is a dry toner.

19. The toner of claim 18, wherein the dry toner is a powder.

20. A process of preparing a microcapsule toner, comprising:
forming a mixture comprising a core binder monomer, an oil soluble shell monomer, and a colorant;
dispersing said mixture in an aqueous surfactant solution to form a homogeneous microdroplet suspension;
subjecting said suspension to a shell forming interfacial polycondensation by adding to said suspension a water soluble shell monomer; and
effecting a core binder forming polymerization, wherein binder is chemically grafted to the shell polymer via a spacer linkage which is a reaction product of a polyfunctional reagent with precursors of said core binder and said shell polymer.

21. A process according to claim 20, wherein said core binder forming polymerization is a free radical polymerization.

22. A process according to claim 21, wherein the interfacial polycondensation is conducted at a temperature range of about room temperature to about 50° C., and wherein the free radical polymerization is conducted at a temperature range of about 30° C. to about 130° C.

23. A process according to claim 21, wherein the interfacial polycondensation is substantially completed before initiation of the free radical polymerization.

24. A process according to claim 20, wherein said polyfunctional reagent reacts with the oil soluble shell monomer during said dispersing step, and with the binder monomer during said core binder forming polymerization.

25. A process according to claim 20, wherein said polyfunctional reagent reacts with the water soluble shell monomer during the interfacial polycondensation, and reacts with the binder monomer during said core binder forming polymerization.

26. A process according to claim 20, wherein the polyfunctional reagent is represented by the formula

Y-R-X wherein
R is selected from the group consisting of polyalkylene, polysiloxane, polyether, and perfluorocarbon moieties;
Y is methacryloxy, acryloxy, methacrylamido, acrylamido or styryl; and
X is —OH, —NH$_2$, —NCO, —COCl, —OCOCl or epoxy.

27. A process according to claim 20, wherein the polyfunctional reagent is

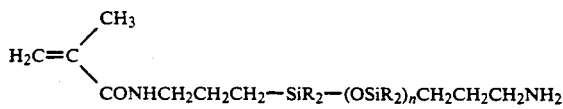

wherein R is an alkyl group and n=10–1000.

28. A process according to claim 20, wherein said polyfunctional reagent is selected from the group consisting of isocyanato-ethyl methacrylate, 2-isocyanato-ethyl acrylate, 3-isocyanato-propyl methacrylate, 3-isocyanato-propyl acrylate, isocyanato-butyl methacrylate, isocyanato-butyl acrylate, isocyanato-pentyl methacrylate, isocyanato-pentyl acrylate, isocyanato-hexyl methacrylate, isocyanato-hexyl methacrylate, isocyanato-heptyl methacrylate, isocyanato-heptyl acrylate, isocyanato-octyl methacrylate, isocyanato-octyl acrylate, isocyanato-lauryl methacrylate, isocyanato-dodecane methacrylate, m-isocyanato-styrene, p-isocyanato-styrene, o-isocyanato-styrene, m-isocyanato-alpha-methyl styrene, o-isocyanato-alpha-methyl styrene, p-isocyanato-alpha-methyl styrene, (3-isocyanato-phenyl)-methacrylate, (2-isocyanato-phenyl)-methacrylate, (4-iso-cyanato-phenyl)-methacrylate, (3-isocyanato-phenyl)-acrylate, 2-amino-ethyl acrylate, 3-amino-propyl methacrylate, 3-amino-propyl acrylate, amino-butyl methacrylate, amino-butyl acrylate, amino-pentyl methacrylate, amino-pentyl acrylate, amino-hexyl methacrylate, amino-hexyl acrylate, amino-heptyl methacrylate, amino-heptyl acrylate, amino-octyl methacrylate, amino-octyl acrylate, amino-lauryl methacrylate, amino-dodecane methacrylate, 2-(2-amino-ethyl) acrylate, 3-amino-propyl methacrylate, 3-amino-propyl acrylate, amino-butyl methacrylate, amino-butyl acrylate, amino-pentyl methacrylate, amino-pentyl acrylate, amino-hexyl methacrylate, amino-hexyl methacrylate, amino-heptyl methacrylate, amino-heptyl acrylate, amino-octyl methacrylate, amino-octyl acrylate, amino-lauryl methacrylate, amino-dodecane methacrylate, 1-(1-isocyanato-1-methylethyl)-3-(1-methylethenyl)-benzene.

29. A process according to claim 20, wherein said polyfunctional reagent is selected from the group consisting of Bis-N,N'(2-hydroxyethyl) methacrylamide, Bis-N,N'(2-hydroxyethyl) acrylamide, Bis-N,N'(3-hydroxypropyl) methacrylamide, Bis-N,N'(3-hydroxypropyl) acrylamide, 2,4-diisocyanato-styrene, 2,4-diisocyanato-styrene, 2,3-diisocyanato-styrene, 2,5-diisocyanato-styrene, 3,5-diisocyanato-styrene, 2,3-diisocyanato-alpha-methylstyrene, 2,4-diisocyanato-alpha-methylstyrene, 2,5-diisocyanato-alpha-methylstyrene, 3,5-diisocyanato-alpha-methylstyrene, 3,5-diisocyanato-alpha-methylstyrene, Bis(N-ethyl-2-methacrylamido) amine, Bis(N-ethyl-2-acrylamido) amine, 2,4-diaminostyrene, 2,5-diaminostyrene, 3,5-diaminostyrene, 2,3-diamino-styrene, 2,4-diamino-alpha-methyl-styrene, 2,5-diamino-alpha-methyl-styrene, 3,5-diamino-alpha-methyl-styrene, 2,3-diamino-alpha-methyl-styrene, N-acryloyltris-(hydroxy-methyl)-amino methane, 1,3-dimethacryloyl-4,6-diiso-cyanatobenzene, 1,3-dimethacryloyl-4,6-diamino-benzene.

30. A process according to claim 20, wherein the oil soluble shell monomer is a polyisocyanate or polyacyl halide, and the water soluble shell monomer is a polyamine, polyol or mixture thereof.

31. A process according to claim 20, wherein the binder monomer is an acrylate, methacrylate or styryl monomer.

32. A process according to claim 20, wherein said average diameter of said microcapsule is from about 3 to about 30 microns.

33. A process according to claim 20, wherein said mixture further comprises a preformed core binder.

34. A process according to claim 20, wherein said colorant comprises a color pigment, a dye or a mixture thereof.

35. A process according to claim 20, wherein said mixture further comprises an organic diluent.

36. A process according to claim 20, wherein said mixture is dispersed by high shear blending.

37. A process according to claim 20, wherein the toner comprises a volume particle size of from 7–19 microns.

38. The process of claim 20, wherein the microcapsule toner is a dry toner.

39. The process of claim 38, wherein the dry toner is a powder.

* * * * *